(12) United States Patent
Liem et al.

(10) Patent No.: US 7,040,004 B2
(45) Date of Patent: May 9, 2006

(54) METHOD OF MAKING A DATA STORAGE DEVICE HAVING AN ACTUATOR WITH A RAIL

(75) Inventors: Andre Liem, Singapore (SG); CheeWai Seetoh, Singapore (SG); Niroot Jierapipatanakul, Singapore (SG); Michael JooChiang Toh, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 555 days.

(21) Appl. No.: 09/998,123

(22) Filed: Nov. 30, 2001

(65) Prior Publication Data

US 2002/0144393 A1 Oct. 10, 2002

Related U.S. Application Data

(60) Provisional application No. 60/283,106, filed on Apr. 10, 2001.

(51) Int. Cl.
*G11B 5/48* (2006.01)
*G11B 21/16* (2006.01)
*G01R 31/28* (2006.01)

(52) U.S. Cl. .............................. 29/603.03; 29/603.08; 29/603.09; 29/593; 360/244.2; 360/244.9; 703/2

(58) Field of Classification Search ............. 29/603.03, 29/603.08, 603.09, 593; 360/244.2, 244.9, 360/291.9, 265.9, 292; 703/1, 2
See application file for complete search history.

(56) References Cited

U.S. PATENT DOCUMENTS

| | | | |
|---|---|---|---|
| 4,408,238 A | 10/1983 | Hearn | |
| 5,014,146 A | 5/1991 | Takatsuka et al. | |
| 5,268,805 A | 12/1993 | Peng et al. | |
| 5,408,372 A | 4/1995 | Karam, II | |
| 5,455,727 A | 10/1995 | Baral et al. | |
| 5,966,269 A | 10/1999 | Marek et al. | |
| 5,973,883 A | 10/1999 | Yanagisawa | |
| 5,978,178 A | 11/1999 | Adley | |
| 5,991,122 A | 11/1999 | Tangren et al. | |
| 6,023,574 A * | 2/2000 | Tangren | 703/2 X |
| 6,088,194 A | 7/2000 | Imaino et al. | |
| 6,090,147 A * | 7/2000 | Bremner et al. | 703/1 |
| 6,091,578 A * | 7/2000 | Stole et al. | 360/265.9 |

FOREIGN PATENT DOCUMENTS

WO        WO 99/09544        *  2/1999

OTHER PUBLICATIONS

Kugel et al, "Behavior of Piezoelectric Actuators under High Electric Field", IEEE Transactions on Ferroelectgrics, vol. 2, pp. 655-658, Aug. 1996.*

* cited by examiner

*Primary Examiner*—A. Dexter Tugbang
(74) *Attorney, Agent, or Firm*—Derek J. Berger

(57) ABSTRACT

Longitudinal edges of an actuator arm are provided with stiffening elements in order to raise natural resonant frequencies of the arm so as to prevent resonance from occurring. The stiffening element is shaped and positioned so as to be able to individually "tune" the natural resonant frequency of a given bending mode without significantly affecting the natural frequencies in other bending modes.

17 Claims, 4 Drawing Sheets

METHOD OF MAKING A DATA STORAGE DEVICE HAVING AN ACTUATOR WITH A RAIL

CROSS REFERENCE TO RELATED APPLICATION

This application claims the benefit of U.S. Provisional Application No. 60/283,106, filed Apr. 10, 2001.

FIELD OF THE INVENTION

This invention relates generally to the field of hard disc drive data storage devices, and more particularly, but not by way of limitation, to disc drive actuators.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 15,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative pneumatic relationship with a thin layer of air dragged along by the spinning discs to fly the head assembly in a closely spaced relationship to the disc surface. In order to maintain the proper flying relationship between the head assemblies and the discs, the head assemblies are attached to and supported by flexures attached to the actuator.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. The actuator is mounted to the pivot shaft by precision ball bearing assemblies within a bearing housing. The actuator supports a flat coil which is suspended in the magnetic field of an array of permanent magnets, which are fixedly mounted to the disc drive housing base member. These magnets are typically mounted to pole pieces which are held in positions vertically spaced from another by spacers at each of their ends.

On the side of the actuator bearing housing opposite to the coil, the actuator assembly typically includes a plurality of vertically aligned, radially extending actuator head mounting arms, to which the head suspensions mentioned above are mounted. These actuator arms extend between the discs, where they support the head assemblies at their desired positions adjacent the disc surfaces. When controlled DC current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved generally radially across the data tracks of the discs along an arcuate path.

As explained above, the actuator assembly typically includes an actuator body that pivots about a pivot mechanism disposed in a medial portion thereof. The function of the pivot mechanism is crucial in meeting performance requirements associated with the positioning of the actuator assembly. A typical pivot mechanism has two ball bearings with a stationary shaft attached to an inner race and a sleeve attached to an outer race. The sleeve is also secured within a bore in the actuator body. The stationary shaft typically is attached to the base deck and the top cover of the disc drive.

As disc drive consumers demand ever higher storage capacity and data access speeds, track densities have increased to the point at which a single 3.5 inch disc can store over 40 gigabytes of data. Track densities are projected to increase far beyond these numbers. Because tracks are increasingly smaller and closer together, it is more important than ever that the actuator and servo system be designed so as to minimize undesirable actuator movement caused by vibration and external disturbances.

Undesirable actuator movement is exacerbated by resonance within a vibrating actuator. All moving mechanical systems are characterized by natural resonance frequencies. When an actuator vibrates in a particular mode at a frequency equal to the resonant frequency of that mode, the vibrations intensify until the servo system can no longer effectively control actuator movement. It is therefore generally desirable that an actuator system be designed such that the resonant frequencies in each mode are as high as possible so as to prevent resonance within the actuator system.

An actuator system has four primary bending modes, each having a resonant frequency a designer must be concerned with. One such bending mode, conventionally known as a "first bending mode," involves bending of the actuator arm out of the rotational plane of the actuator, where the bending takes place near the pivot cartridge. Another bending mode, conventionally known as a "second bending mode," similarly involves bending out of the rotational plane of the actuator, but where the bending takes place further away from the pivot axis, near the flexure support end of the actuator arm. A third bending mode is the "first torsion mode," in which the actuator arm twists about a longitudinal axis of the actuator arm, such that the plane of the actuator intersects but is no longer parallel to the rotational plane of the actuator. A fourth primary bending mode is the "first sway mode," in which the actuator arm bends within the rotational plane of the actuator. As the servo system directs the actuator to move the head from track to track, the actuator will vibrate in these various modes. As long as the frequencies generated by the servo system remain below the various resonant frequencies of the actuator, the drive will continue to function properly. It should be clear that the speed at which the drive may operate is limited by the resonant frequencies of the actuator system. It is generally a goal of actuator design, therefore, to raise the natural resonant frequencies of the actuator system to allow for faster drive operation.

This has typically been accomplished by maximizing the stiffness of the actuator assembly. The conventional method for increasing actuator stiffness has been to (1) increase the thickness of the actuator, (2) increase the width of the actuator, or (3) manufacturing the actuator from a different material. There are several disadvantages associated with increasing stiffness in this way. First, increasing thickness or width increases the moment of inertia of the actuator. This decreases the speed at which the actuator may change direction, begin moving a head to a track, or to settle once the head has reached a desired track. Second, improvement of overall stiffness using this method is minimal, possibly even insignificant. And third, it is impossible to individually tune the various mode shape frequencies. For example, thickening the actuator would stiffen it against bending, torsion and sway, thereby proportionally increasing the frequencies of all four modes even if the resonant frequencies in some of these modes may be sufficiently high.

What the prior art has been lacking is an actuator design methodology which allows individual tuning of the various mode shapes, producing an actuator which is optimized to conform to servo bandwidth requirements.

SUMMARY OF THE INVENTION

The present invention is directed to an actuator design methodology which allows individual tuning of resonant frequencies of various bending modes of an actuator system. An element or elements are provided on at least one edge of an actuator arm which increase stiffness in at least one direction without significantly increasing stiffness in another, such that resonance can be prevented without significantly increasing the rotational inertia of the system.

DETAILED DESCRIPTION OF THE INVENTION

Figure 1:
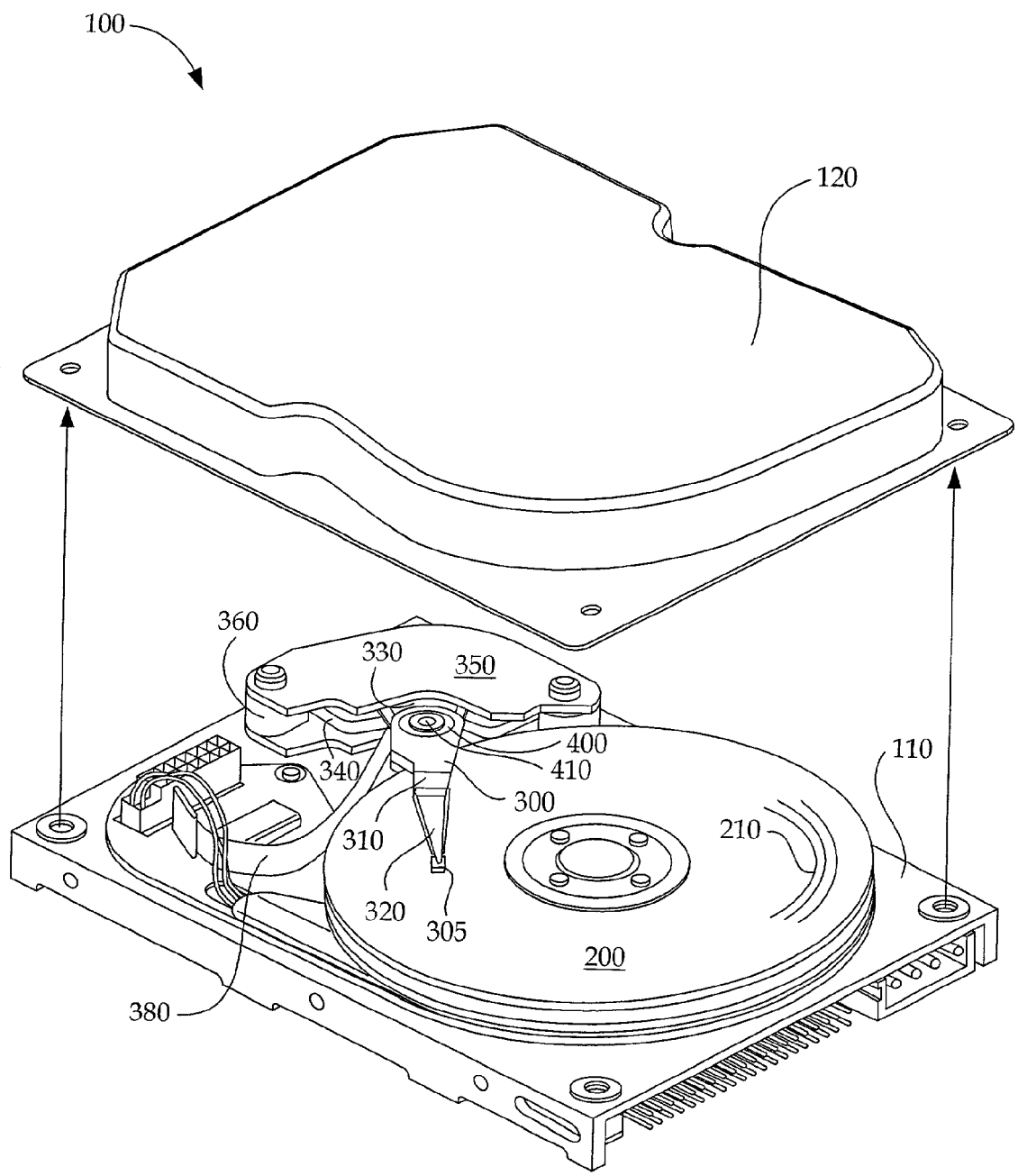
FIG. 1 shows an exploded view of a disc drive incorporating the actuator design methodology of the present invention.

Turning now to the drawings and specifically to FIG. 1, shown is an exploded view of an example of a disc drive 100 in which the present invention is particularly useful. The disc drive 100 includes a deck 110 to which all other components are directly or indirectly mounted and a top cover 120 which, together with the deck 110, forms a disc drive housing which encloses delicate internal components and isolates these components from external contaminants.

The disc drive 100 includes a plurality of discs 200 which are mounted for rotation on a spindle motor (not shown). The discs 200 include on their surfaces a plurality of circular, concentric data tracks 210 on which data are recorded via an array of vertically aligned head assemblies (one of which is shown at 310). The head assemblies 305 are supported by flexures 320, which are attached to arms 310 of actuator 300. The actuator 300 is mounted to a bearing assembly 400 which includes a stationary pivot shaft 410 about which the actuator 300 rotates.

Power to drive the actuator 300 about the pivot shaft 410 is provided by a voice coil motor (VCM). The VCM consists of a coil 330 which is supported by the actuator 300 within the magnetic field of a permanent magnet assembly having spaced upper and lower magnets 340. The magnets 340 are mounted to spaced pole pieces 350 which are fixed to the deck 110 and are further spaced from one another by spacers 360. Electronic circuitry is provided on a printed circuit board (PCB, not shown) mounted to the underside of the deck 110. Control signals to drive the VCM are carried between the PCB and the moving actuator 300 via a flexible printed circuit cable (PCC) 380, which also transmits data signals to and from the heads 310.

Figure 2:
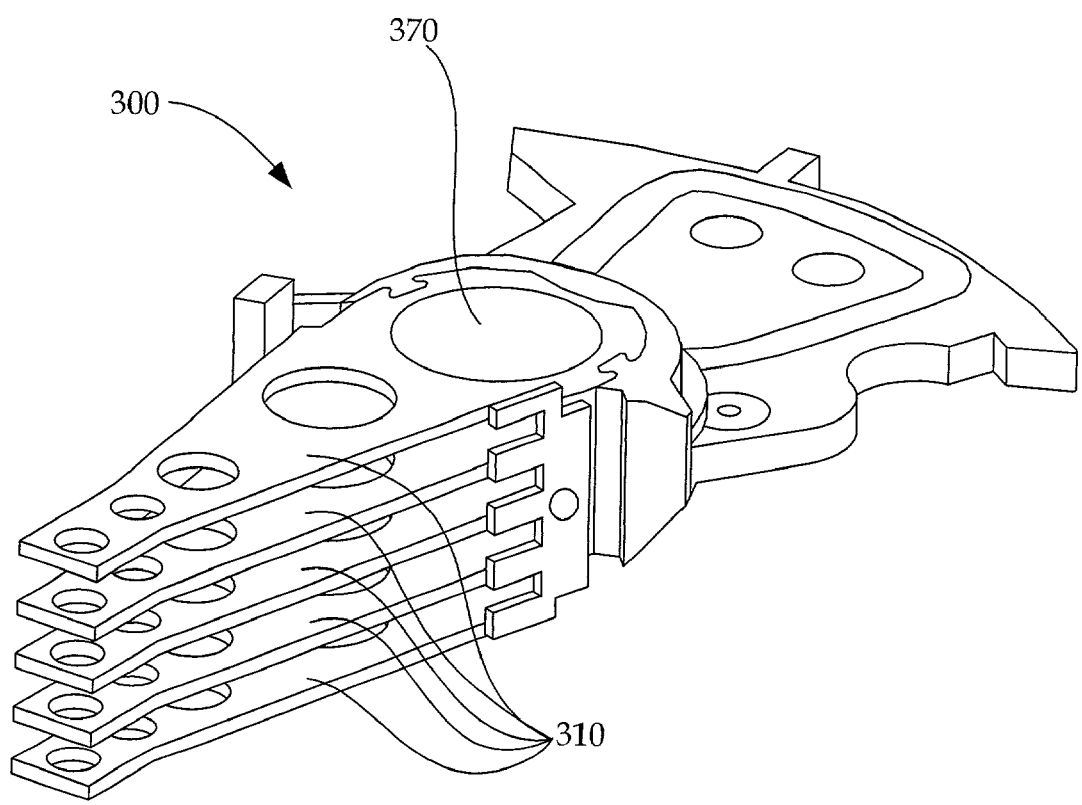
FIG. 2 shows a perspective view of an actuator incorporating the bearing mounting assembly of the present invention.

FIG. 2 shows one example of an actuator 300 of the type in which the design methodology of the present invention could be implemented. The actuator 300 has a bore 370 formed therethrough which receivingly engages a bearing assembly. Extending outwardly are actuator arms 310 for supporting flexures 320.

Figure 3:
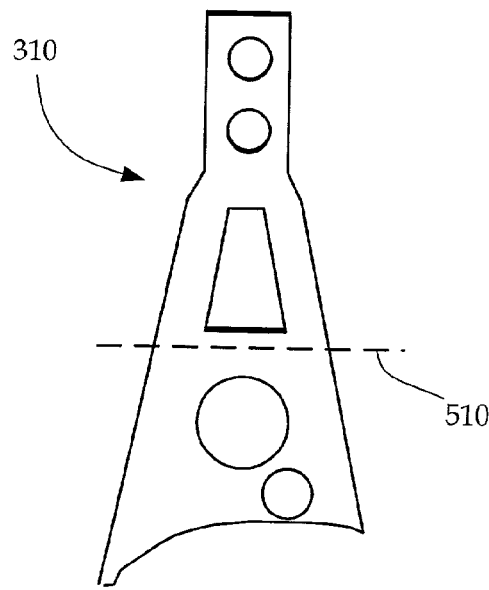
FIG. 3 depicts an actuator arm in the first bending mode.
Figure 4:
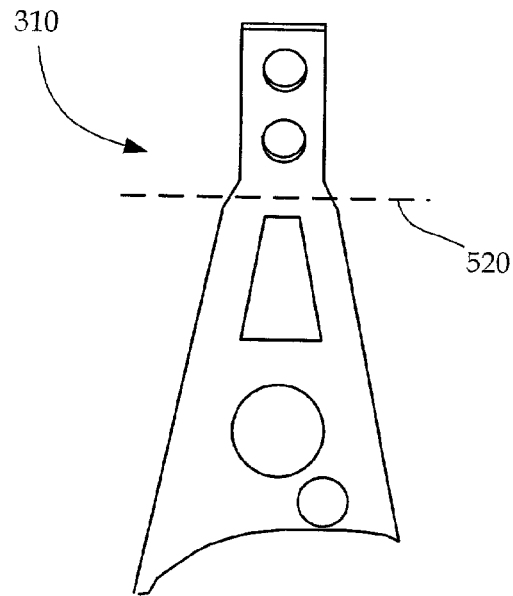
FIG. 4 depicts an actuator arm in the second bending mode.
Figure 5:
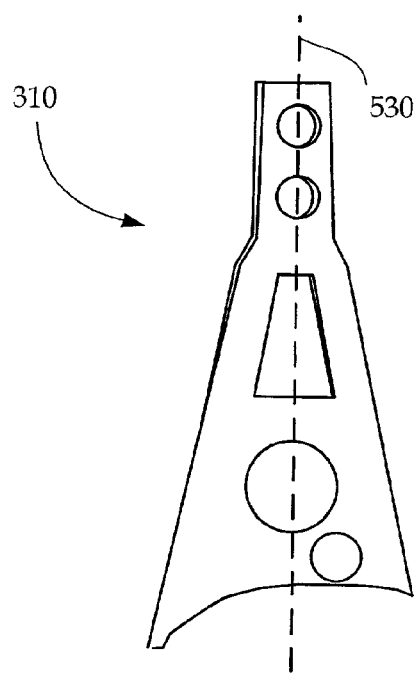
FIG. 5 depicts an actuator arm in the first torsional mode.
Figure 6:
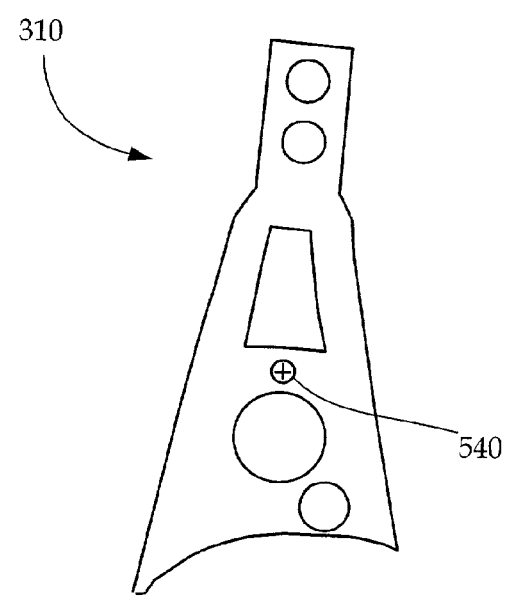
FIG. 6 depicts an actuator arm in the sway mode.

FIGS. 3–6 each show a view from above of an actuator arm 310 lying in a horizontal plane, in which the various bending modes are shown in isolated fashion. FIG. 3 shows an actuator arm 310 in the first bending mode, where the actuator vibrates out of the plane of the actuator generally about an axis 510. Because the arm 310 will generally be more compliant in the vertical direction, and because there is a great deal of arm mass outside of axis 510, the first bending mode typically has the lowest resonant frequency of the various bending modes. FIG. 4 shows an arm 310 in the second bending mode, in which the arm 310 vibrates out of the plane of the actuator generally about an axis 520 toward the end of the arm 310. Because there is much less arm mass outside of this axis, the resonant frequency in the second bending mode is significantly higher than in the first bending mode. FIG. 5 shows an arm 310 vibrating in the torsional mode, in which the arm twists about an axis 530 lying generally along a longitudinal axis of the arm 310. FIG. 6 shows an arm 310 vibrating in the sway mode, in which the arm 310 vibrates in the plane of the actuator generally about a vertical axis 540.

Of course, during disc drive operation, actuator arm 310 is not merely undergoing one of the bending modes described above, but all four of them simultaneously. It should further be noted that other bending modes exist other than these four, and the design methodology of the present invention could be applied to these also. However, for our purposes description has been limited to these four, as they are the primary sources of vibration which could lead to resonance within the actuator system.

As explained above, as vibration in any of these modes approaches the resonant frequency for that mode, vibrations will increase until the actuator system is no longer stable, leading to an inability of the actuator 300 to properly position the heads 305 over a given track 210, and will also impair the ability of the actuator 300 to allow the head 305 to follow a given track 210. Through testing and/or modeling, the resonant frequencies of each mode of a given actuator can be determined, and the ability of the actuator to be effective in a given drive with a given servo design can also be determined. In the past, when it was found that one or more of the resonant frequencies of the actuator system, the arm 310 was thickened so as to raise the resonant frequencies of the system. Simply thickening the arm 310 will stiffen it with respect to all four bending modes. However, thickening the arm 310 will also significantly increase its inertia. The result is often that while resonant frequencies are raised so as to enable an actuator to operate within a given servo system, the rise in inertia limits the ability of the actuator 300 to respond quickly to servo commands. In other words, the benefits of higher stiffness are at least to some extent offset by the increase in rotational inertia.

Figure 7:
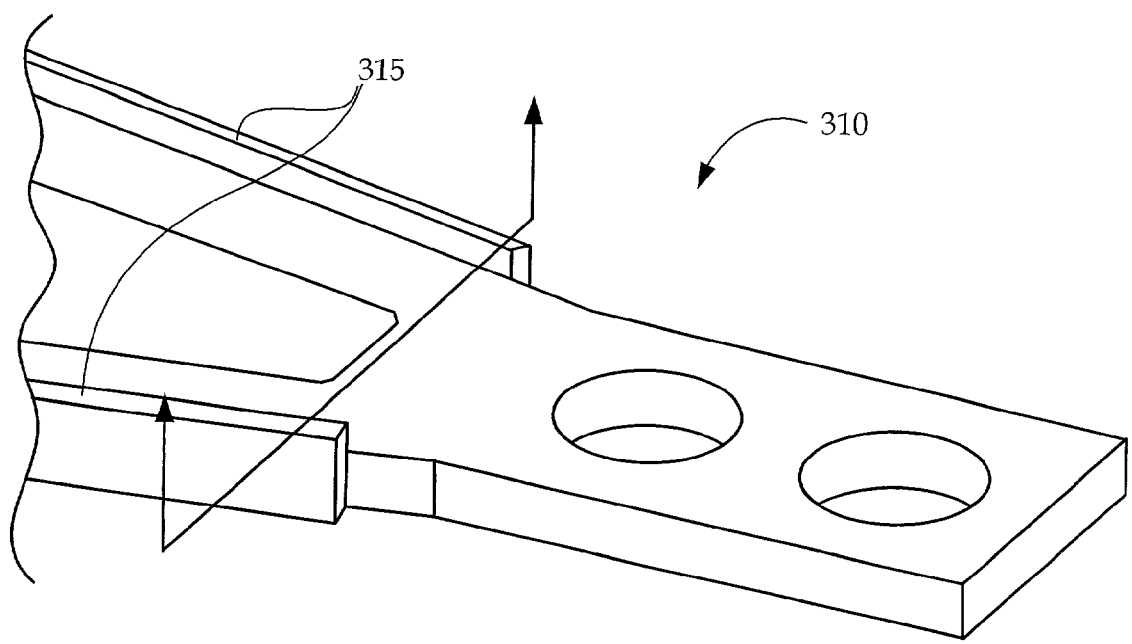
FIG. 7 shows a perspective view of an actuator arm with rails along its edges.
Figure 8:
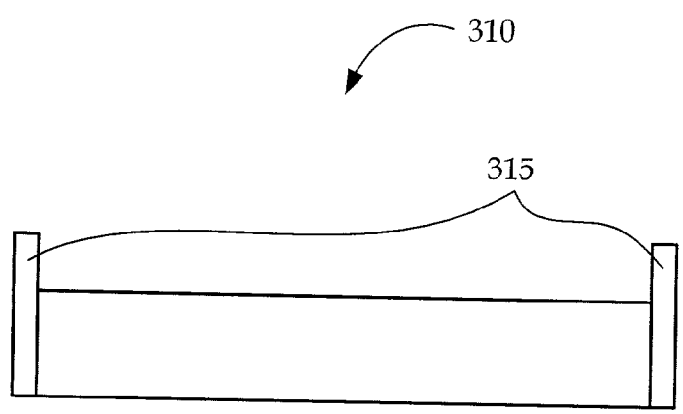
FIG. 8 shows a cross-sectional view of the actuator arm of FIG. 7.

In a preferred embodiment of the present invention, the actuator arm is stiffened by adding structure to the sides of the actuator arm 310. FIG. 7 shows one embodiment in which rails 315 are provided along the sides. These rails 315 may be integrally formed along with the arm 310 or they may be attached to the arm 310 by any conventional method such as adhesive or welding. FIG. 8 shows a cross-sectional view of the arm of FIG. 7 along line 8—8. In this embodiment, the rails 315 are generally planar and vertically extending, and rectangular in cross-section as can be seen in FIG. 8. It should be clear that because the rails 315 lie in a vertical plane, the rails 315 serve to stiffen the arm 310 in a vertical direction significantly more than it stiffens the arm 310 in a horizontal direction. As a result, the rails 315 serve to raise the resonant frequency of the arm 310 in the first bending mode significantly more than they do the resonant frequencies of the sway and torsional modes. Moreover, the length of the rails 315 also determines to what extent the frequency of the second bending mode is raised. For example, if the rails 315 extend all the way to the end of the arm 310, the frequency of the second bending mode could be raised significantly. Extending the rails 315 only partly toward the end of the arm 310, on the other hand, would limit the extent to which the second bending mode frequency is raised.

Adding elements such as rails 315 to an arm 310 permits a designer to stiffen the arm 310 without significantly increasing its rotational inertia, such that the actuator 300 should be able to respond quickly to the demands of the servo system without becoming resonant.

Moreover, it should be clear that addition of rails 315 to arm 310 allows "fine turning" of the actuator. For example, if the actuator system is experiencing resonance only in the first bending mode, rails 315 could be added so that stiffness is increased primarily only near the axis about which the actuator bends in the first bending mode. The rails 315 may be lengthened if it is desired to raise the frequency of the second bending mode as well. The dimensions of the rails 315 can also be chosen so as to selectively stiffen the arm 310. For example, thickening a rail 315 will obviously raise the resonant frequency of the sway mode without significantly altering that of the first and second bending modes. Similarly, making the rails tall and thin will obviously raise the resonant frequency of the bending modes without significantly altering that of the sway mode.

While the rails 315 are shown to be rectangular in cross-section in the illustrated embodiment of FIGS. 7 and 8, it should of course be recognized that the stiffening elements are not limited to this shape. Nor must the elements 315 be uniform in cross-section, as altering the cross-section along the length of the elements 315 could be used to fine tune the actuator resonances to even a finer degree. Moreover, it should be understood that the elements 315 may instead comprise a number of elements positioned in spaced relation along arm 310. While typically elements 315 will be provided on both longitudinal edges of the actuator, it should also be recognized that a single element 315 along only one edge would also provide a degree of fine tuning.

Alternately stated, a first contemplated embodiment of the invention takes the form of a method for making a disc drive (such as 100) having an actuator system (such as 300) designed with an arm (such as 310) having first and second longitudinal edges as follows. It is determined that the actuator (300) is designed with a spring-mass structure characterized by a first bending mode having a first natural resonant frequency and a second bending mode having a second natural resonant frequency. The arm is modified so as to raise the first and second natural resonant frequencies, by providing a first stiffening element (such as 315) on the first longitudinal edge. The first stiffening element (such as 315) is configured to maximize a rise of the first natural resonant frequency while minimizing a rise of the second natural resonant frequency. This designed actuator (such as 300) is assembled into the disc drive (such as 100) adjacent a first rotatable disc (such as 200). A second stiffening element (such as 315) may also be provided on the second longitudinal edge of the arm (such as 310). The first and second stiffening elements (such as 315) may be identical, and the stiffening element (such as 315) may take the form of a rail (such as 315) extending along the first longitudinal edge of the arm (such as 310). The arm (such as 310) may be generally planar so as to define a first plane, and the first stiffening element (such as 315) may be generally planar and define a second plane, such that the second plane may be generally orthogonal to the first plane. The first stiffening element (such as 315) may be integrally formed with the arm (such as 310). The determining and modifying steps may be performed upon a prototype of the designed actuator (such as 300), in which case the assembling step includes copying the modified prototype to construct a production version of the designed actuator (such as 300) that is similar to the modified prototype, before assembling the production version of the designed actuator (such as 300) into the disc drive (such as 100). The stiffening element (such as 315) may have a cross-section which is asymmetric.

Alternately stated, a second contemplated embodiment of the invention takes the form of a method of preventing resonance in a disc drive actuator (300) having an actuator arm (such as 310) having first and second longitudinal edges and being characterized by first and second bending modes. The first bending mode is characterized by a first natural resonant frequency and the second bending mode is characterized by a second natural resonant frequency. The method is as follows. A determination is made as to a likelihood that the actuator (such as 300) will become resonant in the first bending mode during drive operation. A determination is made as to a likelihood that the actuator (such as 300) will become resonant in the second bending mode during drive operation. The arm (such as 310) is modified so as to raise one of the natural resonant frequencies to a substantially greater degree than the other of the natural resonant frequencies. Optionally, the modification may be performed by providing a stiffening element (such as 315) on one of the longitudinal edges of the arm (such as 310). This stiffening element (such as 315) may take the form of a rail (such as 315) extending along the one longitudinal edge of the arm (such as 310), and may optionally be is integrally formed with the arm (such as 310). The modification step may further include providing a second stiffening element (such as 315) on the other of the longitudinal edges of the arm (such as 310). The first and second stiffening elements (such as 315) may be identical.

From the foregoing, it is apparent that the present invention is particularly suited to provide the benefits described above. While particular embodiments of the invention have been described herein, modifications to the embodiments which fall within the envisioned scope of the invention may suggest themselves to one of skill in the art who reads this disclosure.

What is claimed is:

1. A method for making a data storage device having an actuator system designed with an arm having first and second longitudinal edges, the method comprising steps of:
   a) determining that the actuator system is designed with a spring-mass structure characterized by a first bending mode having a first natural resonant frequency and a second bending mode having a second natural resonant frequency;
   b) modifying the arm so as to raise the first and second natural resonant frequencies, modifying step (b) further comprising a step of:
      b1) providing a first stiffening element protruding from the first longitudinal edge, the first stiffening element being configured to maximize a rise of the first natural resonant frequency while minimizing a rise of the second natural resonant frequency; and
   c) assembling the actuator system into the data storage device adjacent a storage medium.

2. The method of claim 1 in which modifying step (b) further comprises a step of:
   b2) providing a second stiffening element on the second longitudinal edge.

3. The method of claim 2 in which the first and second stiffening elements are identical.

4. The method of claim 1 in which the first stiffening element comprises a rail extending along the first longitudinal edge.

5. The method of claim 1 in which the arm is generally planar and defines a first plane, and in which the first stiffening element is generally planar and defines a second plane, the second plane being generally orthogonal to the first plane.

6. The method of claim 1 in which the first stiffening element is and the arm are formed from an integral piece of material.

7. The method of claim 1 in which the determining step (a) and the modifying step (b) are performed upon a prototype of the designed actuator, in which assembling step (c) further comprises steps of:
   c1) copying the modified prototype to construct a production version of the designed actuator that is similar to the modified prototype; and
   c2) assembling the production version of the designed actuator into the data storage device.

8. The method of claim 7 in which the stiffening element has a cross-section which is asymmetric.

9. A method for making a data storage device having an actuator system designed with an arm having first and second longitudinal edges, the arm further being characterized by first and second bending modes, the first bending mode being characterized by a first natural resonant frequency and the second bending mode being characterized by a second natural resonant frequency, the method comprising steps of:
   a) determining a likelihood that the arm will become resonant in the first bending mode during device operation;
   b) determining a likelihood that the arm will become resonant in the second bending mode during device operation;
   c) providing a stiffening element on the arm so as to raise one of the natural resonant frequencies to a substantially greater degree than the other of the natural resonant frequencies, the arm and stiffening element being formed from an integral piece of material; and
   d) assembling the actuator system into the data storage device adjacent a storage medium.

10. The method of claim 9, in which the stiffening element protrudes from one of the longitudinal edges of the arm.

11. The method of claim 10 in which the stiffening element comprises a rail extending along the one longitudinal edge of the arm.

12. The method of claim 10 in which the modifying step (c) further comprises a step of:
   c2) providing a second stiffening element on the other of the longitudinal edges of the arm.

13. The method of claim 12 in which the first and second stiffening elements are identical.

14. A method of making a data storage device, comprising steps of:
   a) a step for tuning a first natural resonant frequency of an actuator arm while minimizing change to a second natural resonant frequency of the arm; and
   b) assembling the actuator arm into the data storage device adjacent a storage medium.

15. The method of claim 14 in which step (a) further comprises a step of:
   a1) modifying the arm so as to raise the first natural resonant frequency.

16. The method of claim 15 in which modifying step (a1) further comprises a step of:
   a1A) providing a stiffening element on a longitudinal edge of the arm.

17. The method of claim 14 in which step (a) further comprises a step of:
   a1) providing a generally elongate stiffening element on the arm, the stiffening element having an asymmetric cross-section.

* * * * *